(12) United States Patent
Hodson et al.

(10) Patent No.: US 7,889,747 B2
(45) Date of Patent: Feb. 15, 2011

(54) APPARATUS, SYSTEM, AND METHOD FOR INTEGRATING A WIRELESS NETWORK WITH WIRED FIELD DEVICES IN A PROCESS CONTROL SYSTEM

(75) Inventors: William R. Hodson, Telford, PA (US); Yu-Gene T. Chen, Glendale, AZ (US); Prasad Samudrala, Bangalore (IN); Alexander Chernoguzov, Warrington, PA (US); Paul F. McLaughlin, Ambler, PA (US)

(73) Assignee: Honeywell International Inc., Morristown, NJ (US)

( * ) Notice: Subject to any disclaimer, the term of this patent is extended or adjusted under 35 U.S.C. 154(b) by 709 days.

(21) Appl. No.: 11/443,773

(22) Filed: May 31, 2006

(65) Prior Publication Data
US 2007/0280286 A1 Dec. 6, 2007

(51) Int. Cl.
*H04L 12/56* (2006.01)
(52) U.S. Cl. ........................ 370/401; 370/466
(58) Field of Classification Search ................. 370/401, 370/402, 465, 466, 467
See application file for complete search history.

(56) References Cited

U.S. PATENT DOCUMENTS

| 5,793,963 | A | 8/1998 | Tapperson et al. |
| 6,032,203 | A | 2/2000 | Heidhues |
| 6,522,664 | B1 | 2/2003 | Kawahara |
| 6,587,900 | B1 | 7/2003 | Wischinski |
| 6,842,454 | B2 * | 1/2005 | Metcalf, III ................. 370/392 |
| 6,847,316 | B1 | 1/2005 | Keller |
| 7,233,745 | B2 | 6/2007 | Loechner |
| 2002/0077711 | A1 | 6/2002 | Nixon et al. |

(Continued)

FOREIGN PATENT DOCUMENTS

DE 10000609 7/2001

(Continued)

OTHER PUBLICATIONS

International Search Report and Written Opinion of the International Searching Authority in PCT Application No. PCT/US2007/069717 dated Dec. 10, 2007.

(Continued)

*Primary Examiner*—Ricky Ngo
*Assistant Examiner*—Wei-Po Kao
(74) *Attorney, Agent, or Firm*—Munck Carter, LLP (57) ABSTRACT

A system for integrating a wireless network with wired field devices includes a field unit that communicates with the wired field devices using a first wired field device protocol. A gateway wirelessly communicates with the field unit and communicates over a network using one or more second wired field device protocols. The gateway also converts between the first wired field device protocol and the one or more second wired field device protocols. The gateway could further permit access to the wired field devices by a component of the process control system (such as a process controller, asset management tool, or configuration tool) that does not support the first wired field device protocol. At least one of the field unit and the gateway could appear as a multiplexer or linking device to the component of the process control system, such as a HART multiplexer or a Foundation Fieldbus or Profibus linking device.

24 Claims, 7 Drawing Sheets

U.S. PATENT DOCUMENTS

| | | |
|---|---|---|
| 2002/0090001 A1 | 7/2002 | Beckwith |
| 2002/0099465 A1 | 7/2002 | Su |
| 2002/0120671 A1 | 8/2002 | Daffner et al. |
| 2002/0122230 A1 | 9/2002 | Izadpanah et al. |
| 2003/0023601 A1* | 1/2003 | Fortier et al. .................. 707/10 |
| 2003/0023795 A1* | 1/2003 | Packwood et al. .......... 710/105 |
| 2004/0196844 A1* | 10/2004 | Hagino ....................... 370/389 |
| 2004/0230899 A1 | 11/2004 | Pagnano et al. |
| 2004/0259533 A1* | 12/2004 | Nixon et al. ............. 455/414.1 |
| 2005/0141553 A1 | 6/2005 | Kim et al. |
| 2005/0164684 A1 | 7/2005 | Chen et al. |
| 2005/0228509 A1* | 10/2005 | James ......................... 700/19 |
| 2005/0276233 A1 | 12/2005 | Shepard et al. |
| 2006/0075009 A1 | 4/2006 | Lenz et al. |
| 2006/0268854 A1* | 11/2006 | Lee ............................. 370/389 |
| 2007/0067458 A1* | 3/2007 | Chand ........................ 709/226 |
| 2007/0153677 A1 | 7/2007 | McLaughlin et al. |
| 2007/0233283 A1 | 10/2007 | Chen |
| 2007/0237137 A1 | 10/2007 | McLaughlin |
| 2009/0097415 A1 | 4/2009 | Shepard et al. |

FOREIGN PATENT DOCUMENTS

| | | |
|---|---|---|
| DE | 103 14 721 A1 | 11/2004 |
| DE | 10314721 A1 | 11/2004 |
| EP | 1 401 171 A2 | 3/2004 |
| GB | 2 427 329 A | 12/2006 |
| GB | 2427329 A | 12/2006 |
| WO | WO 01/35190 A2 | 5/2001 |
| WO | WO 02/05199 A1 | 1/2002 |
| WO | WO 03/079616 A1 | 9/2003 |
| WO | WO 2004/042674 A1 | 5/2004 |
| WO | WO 2004/047385 A2 | 6/2004 |
| WO | WO 2005/086110 A2 | 9/2005 |
| WO | WO 2006/007521 A1 | 1/2006 |
| WO | WO 2006/017994 A1 | 2/2006 |
| WO | WO 2006/053041 A1 | 5/2006 |

OTHER PUBLICATIONS

International Search Report and Written Opinion of the International Searching Authority in PCT Application No. PCT/US2007/069614 dated Nov. 22, 2007.

Pereira J. M. D., "A fieldbus prototype for educational purposes", IEEE Instrumentation and Measurement Magazine, vol. 7, No. 1, Mar. 2004, pp. 24-31.

International Search Report and Written Opinion of the International Searching Authority in PCT Application No. PCT/US2007/069710 dated Nov. 27, 2007.

International Search Report and Written Opinion of the International Searching Authority in PCT Application No. PCT/US2007/069705 dated Apr. 15, 2008.

A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.

Suk Lee, et al., "Integration of Mobile Vehicles for Automated Material Handling Using Profibus and IEEE 802.11 Networks", IEEE Transactions on Industrial Electronics, vol. 49, No. 3, Jun. 2002, p. 693-701.

Andreas Willig, et al., "Wireless Technology in Industrial Networks", Proceedings of the IEEE, vol. 93, No. 6, Jun. 2005, p. 1130-1151.

S. Cavalieri, et al., "On the Integration of Fieldbus Traffic within IEEE 802.11 Wireless LAN", 1997 IEEE, p. 131-138.

"905U-G Wireless Gateway User Manual", ELPRO Technologies Pty Ltd., Aug. 2003, p. 1-89.

"Process Automation, H.I.S. Hart Interface Solutions", Pepperl+Fuchs ELCON, May 17, 2003, p. 1-20.

Jon Tandy, "Wireless HART Communication Creates Extended Meter Reading Network", www.arcomcontrols.com, Apr. 2001, 3 pages.

Jon Tandy, "HART Over Ethernet Networks", www.arcomcontrols.com, Aug. 2002, 7 pages.

International Search Report dated Sep. 28, 2007 in connection with PCT Application No. PCT/US2007/065576.

* cited by examiner

APPARATUS, SYSTEM, AND METHOD FOR INTEGRATING A WIRELESS NETWORK WITH WIRED FIELD DEVICES IN A PROCESS CONTROL SYSTEM

CROSS-REFERENCE TO RELATED APPLICATIONS

This application is related to the following concurrently filed U.S. patent applications:
- Ser. No. 11/444,044 entitled "APPARATUS AND METHOD FOR CONVERTING BETWEEN DEVICE DESCRIPTION LANGUAGES IN A PROCESS CONTROL SYSTEM";
- Ser. No. 11/444,043 entitled "APPARATUS AND METHOD FOR INTEGRATING WIRELESS OR OTHER FIELD DEVICES IN A PROCESS CONTROL SYSTEM"; and
- Ser. No. 11/444,200 entitled "APPARATUS AND METHOD FOR INTEGRATING WIRELESS FIELD DEVICES WITH A WIRED PROTOCOL IN A PROCESS CONTROL SYSTEM";

all of which are hereby incorporated by reference.

TECHNICAL FIELD

This disclosure relates generally to control systems and more specifically to an apparatus, system, and method for integrating a wireless network with wired field devices in a process control system.

BACKGROUND

Processing facilities are often managed using process control systems. Example processing facilities include manufacturing plants, chemical plants, crude oil refineries, and ore processing plants. Among other operations, process control systems typically interact with and control various field devices, such as sensors and actuators, in the processing facilities.

Wireless technology provides opportunities for process control systems to reduce instrumentation costs, such as by reducing the costs of installing and using sensors or other field devices in a control system. This reduction may, for example, be useful for less critical process measurements, where the costs of installing and using wired field devices may exceed the benefits provided by those wired field devices. As a specific example, wireless technology could be used to span certain obstacles, such as roadways, railways, or certain terrains, where the cost of using wired field devices cannot be justified.

A processing facility often has numerous wired field devices in its process control system. These wired field devices may use standard wired protocols to communicate. However, not all field devices are available in every standard wired protocol. As a result, different wired protocols are often intermixed in a process control system.

SUMMARY

This disclosure provides an apparatus, system, and method for integrating a wireless network with wired field devices in a process control system.

In a first embodiment, a system includes a field unit operable to communicate with a plurality of wired field devices in a process control system using a first wired field device protocol. The system also includes a gateway operable to wirelessly communicate with the field unit. The gateway is also operable to communicate over a network using one or more second wired field device protocols. The gateway is further operable to convert between the first wired field device protocol and the one or more second wired field device protocols.

In particular embodiments, the gateway is further operable to permit access to the wired field devices by a component of the process control system that does not support the first wired field device protocol. The component of the process control system could include a process controller, an asset management tool, and/or a configuration tool. At least one of the field unit and the gateway may be operable to appear as a multiplexer or linking device to the component of the process control system. The first wired field device protocol could include a Highway Addressable Remote Transducer (HART) protocol, and the gateway could be operable to cause the wired field devices to appear as one of Foundation Fieldbus field devices and Profibus field devices.

In a second embodiment, an apparatus includes at least one memory operable to store mapping information mapping a first application model associated with a first wired field device protocol and a second application model associated with a second wired field device protocol. The apparatus also includes at least one processor operable to receive first information wirelessly from a field unit that is operable to communicate with a plurality of wired field devices in a process control system. The first information is associated with the first wired field device protocol. The at least one processor is also operable to convert the first information associated with the first wired field device protocol into second information associated with the second wired field device protocol using at least some of the mapping information. In addition, the at least one processor is operable to communicate the second information over a network using the second wired field device protocol.

In a third embodiment, a method includes wirelessly receiving first information from a field unit. The first information is provided by a plurality of wired field devices in a process control system. The wired field devices use a first wired field device protocol to communicate with the field unit. The method also includes converting the first information associated with the first wired field device protocol into second information associated with the second wired field device protocol. In addition, the method includes communicating the second information over a network using the second wired field device protocol.

In a fourth embodiment, a computer program is embodied on a computer readable medium and is operable to be executed by a processor. The computer program includes computer readable program code for receiving first information from a plurality of wired field devices in a process control system. The first information is associated with a first wired field device protocol. The computer program also includes computer readable program code for wirelessly communicating the first information to a gateway. The gateway is operable to convert the first information associated with the first wired field device protocol into second information associated with a second wired field device protocol and to communicate the second information over a network using the second wired field device protocol.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
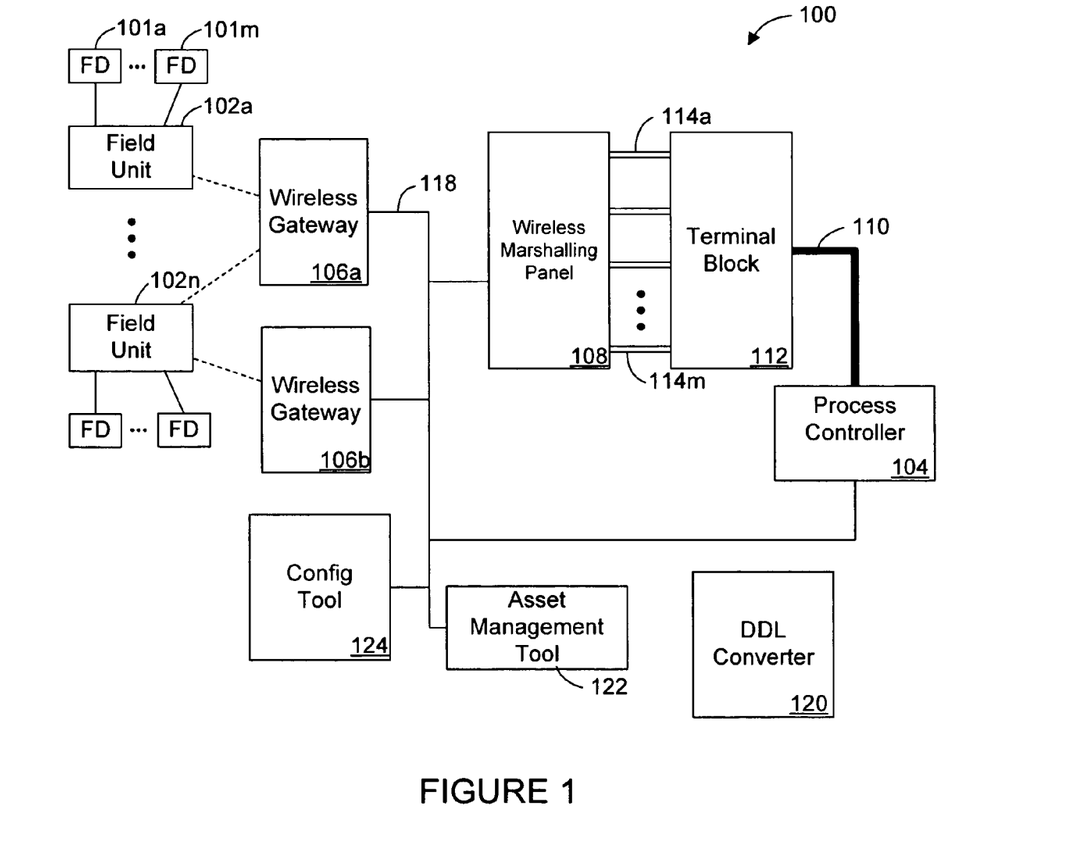
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example, the process control system 100 includes multiple wired field devices (FD) 101a-101m coupled to each of multiple field units 102a-102n. The wired field devices 101a-101m represent components in a process or production system that may perform any of a wide variety of functions. For example, the wired field devices 101a-101m could represent sensors capable of measuring one or more characteristics of a process or production system. The wired field devices 101a-101m could also represent valves or other actuators capable of performing one or more actions that alter the process or production system. Each of the wired field devices 101a-101m includes any suitable device or structure for performing one or more functions in a process or production system.

Each of the field units 102a-102n is coupled to multiple wired field devices 101a-101m. Each of the field units 102a-102n -provides wired connections to the field devices 101a-101m, where the connections are compliant with a wired field device protocol. For example, a field unit 102a could provide wired connections compliant with a Highway Addressable Remote Transducer (HART) protocol, a Foundation Fieldbus (FF) protocol, or a Profibus protocol. As a particular example, the wired field devices 101a-101m coupled to the field unit 102a could communicate using the HART protocol, and the field unit 102a could support the HART protocol and function as a HART multiplexer.

Each of the field units 102a-102n also supports a wireless interface that allows the field units 102a-102n to communicate wirelessly with other components in the process control system 100. For example, the field units 102a-102n could support the WIRELESS NETWORK FOR SECURE INDUSTRIAL APPLICATION (WNSIA) protocol from HONEYWELL INTERNATIONAL INC. Additional information regarding the WNSIA protocol may be found in the patent applications incorporated by reference above.

The wireless interface supported by the field units 102a-102n provides great flexibility in positioning and using the wired field devices 101a-101m. For example, sensors and actuators in a facility could be wired to a field unit 102a, and the field unit 102a could communicate wirelessly with other components in the process control system 100. This could be particularly useful, for example, if the sensors, actuators, and field unit 102a are located in an isolated part of a facility (such as a part of a facility separated from the remainder of the facility by a roadway, a railway, or the terrain in a given area).

Each of the field units 102a-102n includes any suitable device or structure for supporting wired communications with field devices and wireless communications with other component(s) of a process control system. Each of the field units 102a-102n could, for example, include one or more processors and one or more memories storing data and instructions used by the processor(s). The field units 102a-102n may also include powering of wired field devices 101a-101m or the buses that support them. In addition, each of the field units 102a-102n could include at least one interface for communicating with other components, such as an Ethernet interface, a serial interface, and/or a radio frequency (RF) or other wireless interface.

A process controller 104 controls the operation of the wired field devices 101a-101m. For example, the process controller 104 may be capable of receiving data from one or more of the wired field devices 101a-101m (such as sensors) and providing control signals to one or more of the wired field devices 101a-101m (such as actuators). The process controller 104 includes any hardware, software, firmware, or combination thereof for controlling one or more of the wired field devices 101a-101m.

In this example, the wired field devices 101a-101m communicate with the process controller 104 through the field units 102a-102n, one or more wireless gateways 106a-106b, and possibly a wireless marshalling panel 108. Each of the wireless gateways 106a-106b is capable of transmitting information wirelessly to and receiving information wirelessly from the field units 102a-102n. Each of the wireless gateways 106a-106b includes any device or structure for wirelessly communicating with one or more of the field units 102a-102n. Each of the wireless gateways 106a-106b could, for example, include one or more RF transmitters, receivers, or transceivers.

The wireless marshalling panel 108 facilitates communication between the wired field devices 101a-101m and the process controller 104. For example, the wireless marshalling panel 108 may enable the process controller 104 to communicate with the wired field devices 101a-101m without requiring the process controller 104 to understand the communication protocol(s) used by the wired field devices 101a-101m.

As a particular example, the process controller 104 could support the HART protocol, where signals for field devices are transmitted by the process controller 104 over a multi-conductor cable 110 to a terminal block 112. The terminal block 112 separates the signals for the field devices into wire pairs 114a-114m, where each wire pair is associated with a different field device. In these embodiments, the wireless marshalling panel 108 could convert HART-compliant signals received from the process controller 104 into messages sent to the wireless gateways 106a-106b. The wireless marshalling panel 108 could also convert messages from the wireless gateways 106a-106b into HART-compliant signals sent to the process controller 104. The use of the multi-conductor cable 110 and terminal block 112 with the HART protocol is for illustration only. Any other input/output technique and/or communication network could be used with the HART protocol.

The wireless marshalling panel 108 could include any device or structure facilitating communication between the wired field devices 101a-101m (via the gateways 106a-106b) and the process controller 104. Additional details regarding the wireless marshalling panel 108 can be found in U.S. patent application Ser. No. 11/394,947 entitled "APPARATUS, SYSTEM, AND METHOD FOR INTEGRATION OF WIRELESS DEVICES WITH A DISTRIBUTED CONTROL SYSTEM," which is hereby incorporated by reference. The wireless marshalling panel 108 could support the use of any suitable field device protocol(s), such as HART, FF HSE, FF Hl, Modbus, Profibus, and WorldFIP. In this document, the phrase "field device protocol" refers to any protocol(s) for communicating with one or more field devices in a control system (whether or not the field devices of the control system actually use that protocol).

A network 118 couples various components in the process control system 100. The network 118 represents any suitable computing or communication network capable of transporting data, such as one or more local area networks (LANs), metropolitan area networks (MANs), wide area networks (WANs), all or a portion of a global network such as the Internet, or any other communication system or systems at one or more locations. As particular examples, the network 118 could represent an RS-485 network or an Ethernet network. The network 118 could also represent a redundant set of networks, such as a pair of Ethernet networks forming a Fault Tolerant Ethernet (FTE) network.

Each of the wired field devices 101a-101m could have any number of operational parameters, such as tunings, performance statistics, statuses, measurements, and other data of interest. The number of parameters could be rather large, such as dozens, hundreds, or even more. For the process controller 104 to effectively interact with and control the wired field devices 101a-101m, a device description language (DDL) file for each wired field device can be defined. The DDL file for a wired field device typically represents a text-based or other language file that describes the characteristics of a field device, such as the parameters of that field device. The DDL files for field devices are often generated by the manufacturers of those field devices.

Some, many, or all of the DDL files associated with the field devices 101a-101m could be generated using a protocol not supported by another component in the process control system 100. For example, a field device could represent a HART device with an associated HART DDL file, while the process controller 104 may operate using the Profibus protocol. As shown in FIG. 1, a DDL converter 120 is capable of converting a DDL file from one protocol to another. For example, the DDL file associated with a HART field device could be converted into a Profibus DDL file and/or a FF DDL file. As another example, the DDL file associated with a WNSIA field device could be converted into a HART, Profibus, and/or FF DDL file. The DDL converter 120 could operate using any suitable DDL files, including source or binary DDL files.

In this way, a suitable DDL file for each field device may be available for use in the process control system 100. For example, the DDL files generated by the DDL converter 120 could be used in the process control system 100 to ensure that the process controller 104, an asset management tool 122, or a configuration tool 124 can interact with the wired field devices 101a-101m. The DDL converter 120 includes any hardware, software, firmware, or combination thereof for converting information associated with one DDL to information associated with a different DDL. In this document, the phrases "device description language" and "DDL" refer to any text-based or other language that describes the characteristics of one or more field device parameters, including known or to-be-developed standard, proprietary, or other DDLS, electronic DDLs (EDDLs), or other files. While shown as forming part of the process control system 100, the DDL converter 120 need not reside in a process control system 100. For example, the DDL converter 120 could be used by a manufacturer that produces field devices (such as wireless sensors or actuators) for process control systems. The configuration tool 124 may represent a tool used to provide configuration information to components of the process control system 100, allowing the components to be configured or controlled.

In one aspect of operation, the wireless gateways 106a-106b communicate with the field units 102a-102n using a wireless protocol and with the network 118 using one or more wired protocols. For example, the wireless gateways 106a-106b could communicate with the field units 102a-102n using a WNSIA wireless network. The wireless gateways 106a-106b could also communicate over the network 118 using one or more Ethernet or serial protocols, such as HART, FF, Profinet, or Modbus.

In these embodiments, the field units 102a-102n support both the wireless protocol for communication with the wireless gateways 106a-106b and one or more wired protocols for communication with their associated field devices 101a-101m. In some embodiments, each of the field units 102a-102n functions as a multiplexer or linking device (depending on the wired protocol) for the attached wired field devices 101a-101m. For example, the field unit 102a could function as a HART multiplexer providing access to multiple HART field devices. As another example, the field unit 102n could function as a FF or Profibus linking device, which provides access to multiple FF or Profibus field devices.

Together, the field units 102a-102n and the wireless gateways 106a-106b allow the wired field devices 101a-101m to access or be accessed by other components of the process control system 100. This may be done without requiring those other components to understand the wireless protocol used by the field units 102a-102n and the wireless gateways 106a-106b, or even the protocol used by the field devices 101a-101m. For example, from the perspective of the process controller 104, asset management tool 122, or configuration tool 124, the wired field devices 101a-101m may appear as standard HART field devices accessible through a HART multiplexer. The wired field devices 101a-101m could also appear as standard FF or Profibus field devices accessible through a FF or Profibus linking device. The process controller 104, asset management tool 122, and configuration tool 124 need not have any knowledge of the wireless protocol used by the field units 102a-102n and the wireless gateways 106a-106b or the protocol actually used by the field devices 101a-101m.

In some embodiments, the wireless gateways 106a-106b include mapping information or other logic that allows the field units 102a-102n to communicate with other components in the process control system 100 using one or more wired protocols. For example, the wireless gateways 106a-106b could convert between the application model of the wired protocol used by the field unit 102a to communicate with the field devices 101a-101m and the application model(s) of one or more different wired protocols. From the perspective of other components in the process control system 100, the field devices 101a-101m appear to use any wired protocol supported by the wireless gateways 106a-106b, such as standard wired protocols like HART, FF, and Profibus.

In this way, other components in the process control system 100 can interact with and control the field devices 101a-101m using one or more wired protocols. As a particular example, the process controller 104, asset management tool 122, and configuration tool 124 could interact with HART field devices 101a-101m as if the field devices 101a-101m supported the FF and Profibus protocols. These other components in the process control system 100 are not required to support the wireless protocol used by the field units 102a-102n and the wireless gateways 106a-106b or the protocol(s) actually supported by the field devices 101a-101m.

Moreover, the field devices 101a-101m, field units 102a-102n, and wireless gateways 106a-106b could support multiple wired field device protocols. This may allow field devices that use different protocols to be used simultaneously in the process control system 100. In addition, the use of wireless technology in the process control system 100 may help to increase the speed or decrease the delay of control operations by the process controller 104. For example, the field units 102a-102n could scan for secondary variables monitored by HART field devices 101a-101m and for diagnostic reports generated by the HART field devices 101a-101m. The field units 102a-102n may relay this information to the wireless gateways 106a-106b at a higher frequency and with less latency than traditional wired HART multiplexers could. This may provide data to the process controller 104 more rapidly. It may also allow for less-latent notifications to be provided to an alarm notification and reporting subsystem.

While this disclosure may use certain wired and wireless protocols as examples of the protocols that could be used in the process control system 100, this is for illustration only. In other embodiments, different wireless and/or wired protocol(s) could be used in the process control system 100. Moreover, the wireless and/or wired protocol(s) used in the process control system 100 could represent any suitable protocol(s), including proprietary, standard, or widely-available protocol(s).

Although FIG. 1 illustrates one example of a process control system 100, various changes may be made to FIG. 1. For example, a control system could include any number of field devices (including wired and/or wireless field devices), field units, controllers, gateways, wireless marshalling panels, terminal blocks, tools, and DDL converters. Also, the system 100 could include any number and type of connections between the wireless marshalling panel 108 and the process controller 104. Further, FIG. 1 illustrates one functional division between components in the system 100. However, various components in FIG. 1 could be combined or further subdivided, such as by combining the asset management tool 122 and the configuration tool 124 into a single physical unit. Various components could also be omitted from the system 100 if their functionality is not desired or required in a particular implementation. In addition, FIG. 1 illustrates one operational environment in which a wireless network may be integrated with wired field devices. This integration functionality could be used in any other suitable device or system.

Figure 2:
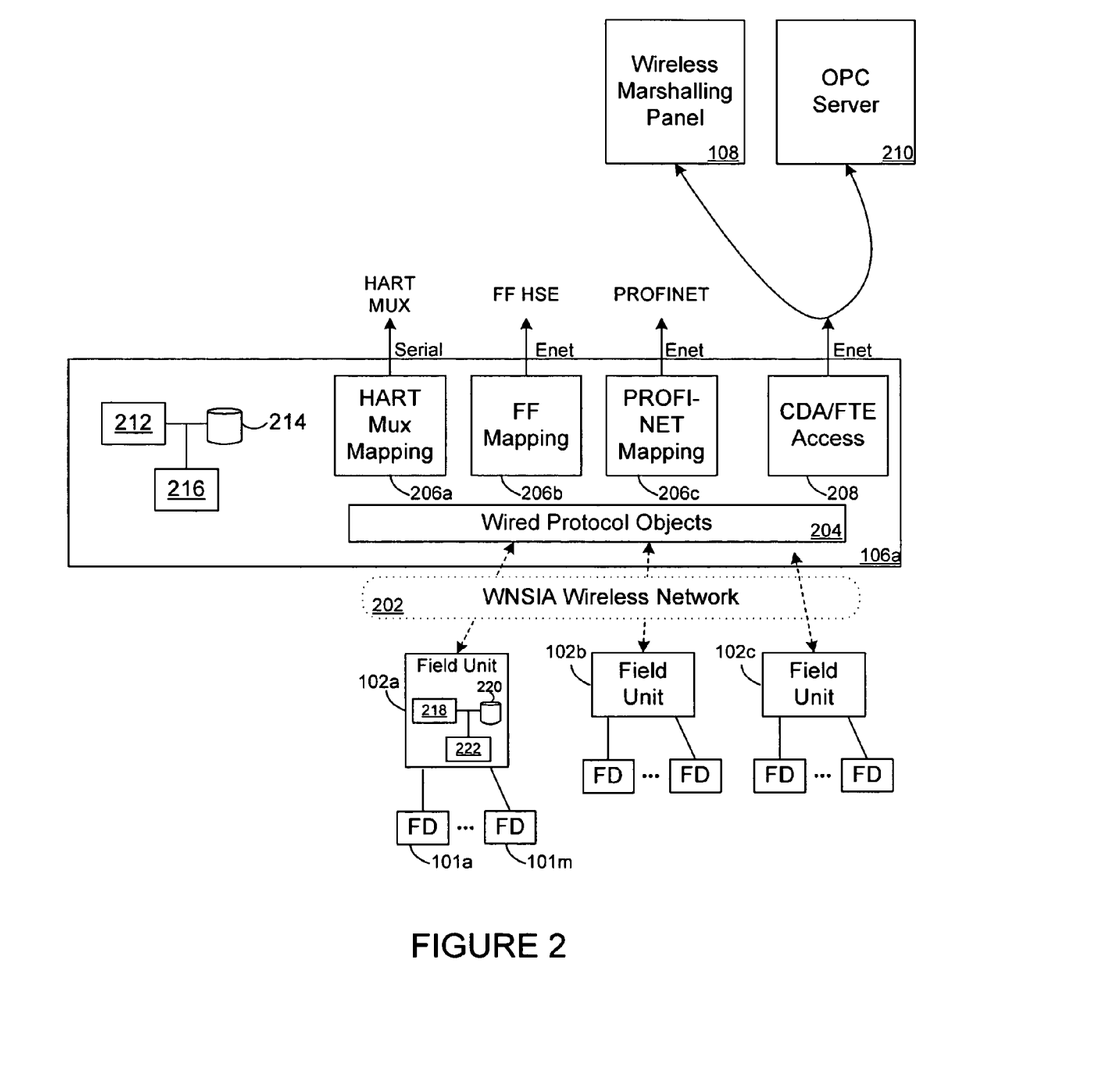
FIG. 2 illustrates an example wireless gateway in a process control system according to one embodiment of this disclosure.

FIG. 2 illustrates an example wireless gateway 106a in a process control system 100 according to one embodiment of this disclosure. The wireless gateway 106a shown in FIG. 2 is for illustration only. Other embodiments of the wireless gateway 106a could be used without departing from the scope of this disclosure. Also, for ease of explanation, the wireless gateway 106a is described as operating in the process control system 100 of FIG. 1. The wireless gateway 106a could be used in any other suitable system.

In this example, three field units 102a-102c communicate with multiple field devices 101a-101m. The field units 102a-102c also communicate with the wireless gateway 106a over a WNSIA wireless network 202. This indicates that the field units 102a-102c and the wireless gateway 106a communicate using a WNSIA wireless protocol. The WNSIA wireless network 202 could represent any suitable network, such as a 56 Mbps 802.11 wireless network.

As shown in FIG. 2, the wireless gateway 106a includes wired protocol objects 204. The wired protocol objects 204 generally represent an application model, which defines how communication with the field devices 101a-101m occurs using a wired protocol. For example, the wired protocol objects 204 could define HART, FF, or Profibus messages that are used to transmit data to the field devices 101a-101m (via the field units 102a-102n). The wired protocol objects 204 could also define the messages containing data that are received from the field devices 101a-101m (via the field units 102a-102n), allowing relevant data to be extracted from the received messages. The wired protocol objects 204 in the wireless gateway 106a could support any suitable wired protocol(s), such as HART, FF, or Profibus.

The wireless gateway 106a also includes various mappings 206a-206c. The mappings 206a-206c map an application model (represented by the wired protocol objects 204) to application models of standard, desired, or other field device protocols. In other words, the mappings 206a-206c define how data from the field devices 101a-101m can be converted into other field device protocols, and vice versa. For example, a HART multiplexer mapping 206a defines how data from the field devices 101a-101m can be converted into a serial HART-compliant data stream (as if the gateway 106a is a HART multiplexer, and the field units 102a-102c are HART sub-multiplexers). The HART multiplexer mapping 206a also defines how data in a serial HART-compliant data stream can be extracted for transmission to the field devices 101a-101m via the field units 102a-102c. An Ethernet form of HART could also be supported by the mapping 206a. The mappings 206b-206c represent similar mappings used with the FF HSE and Profibus protocols, respectively.

In addition to the mappings 206a-206c, the gateway 106a includes a Control Data Access (CDA) or Fault Tolerant Ethernet (FTE) access module 208. The CDA/FTE access module 208 supports access to other components in the process control system 100, such as the wireless marshalling panel 108 or an OLE Process Control (OPC) server 210 (such as an OPC Unified Architecture server). The CDA/FTE access module 208 could operate in a similar manner as the mappings 206a-206c, such as by formatting data for transmission from the gateway 106a and extracting data from messages received by the gateway 106a. While shown as providing access to a wireless marshalling panel 108 and an OPC server 210, this or any other access module 208 could provide access to these or any other or additional components in the process control system 100.

In this embodiment, the wireless gateway 106a could include any hardware, software, firmware, or combination thereof for performing the functions described above. For example, the wireless gateway 106a could include one or more processors 212 and one or more memories 214 storing data and instructions used by the processor(s) 212 (such as the objects, mappings, and integration software). Also, the wireless gateway 106a could include at least one interface 216, which may allow the wireless gateway 106a to communicate with other components of the process control system 100. The interface(s) 216 could represent any suitable interface(s), such as an Ethernet interface (including redundant Ethernet interfaces), a serial interface, or one or more RF transceivers or other wireless equipment for communicating with the field units 102a-102n.

Similarly, in this embodiment, each field unit 102a-102c could include any hardware, software, firmware, or combination thereof for performing the functions described above. For example, each field unit 102a-102c could include one or more processors 218 and one or more memories 220 storing data and instructions used by the processor(s) 218 (such as software facilitating wireless communications). Also, each field unit 102a-102c could include at least one interface 222, which may allow the field unit to communicate with the field devices 101a-101m.

Although FIG. 2 illustrates one example of a wireless gateway 106a in a process control system 100, various changes may be made to FIG. 2. For example, the gateway 106a could support any other or additional wireless protocol(s), mapping(s), access module(s), or wired protocol(s).

Figure 3:
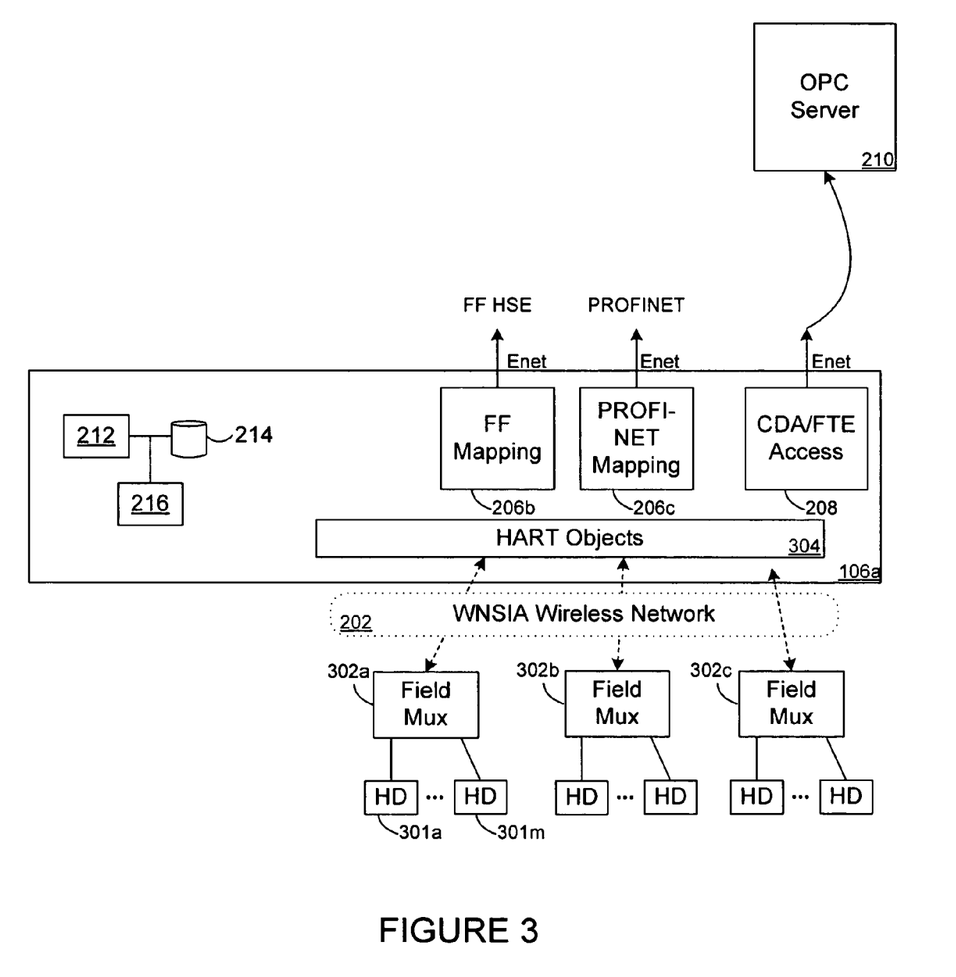
FIGS. 3 through 5 illustrate example configurations of a wireless gateway in a process control system according to one embodiment of this disclosure.
Figure 4:
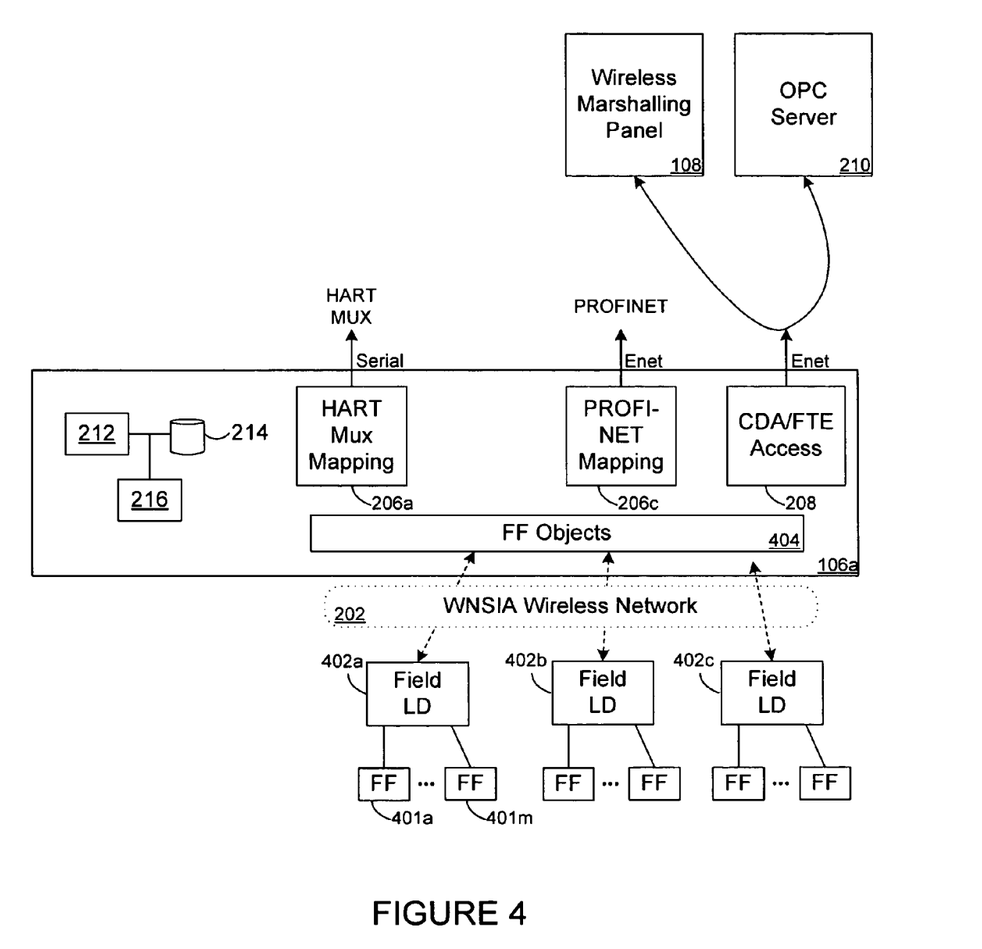
Figure 5:
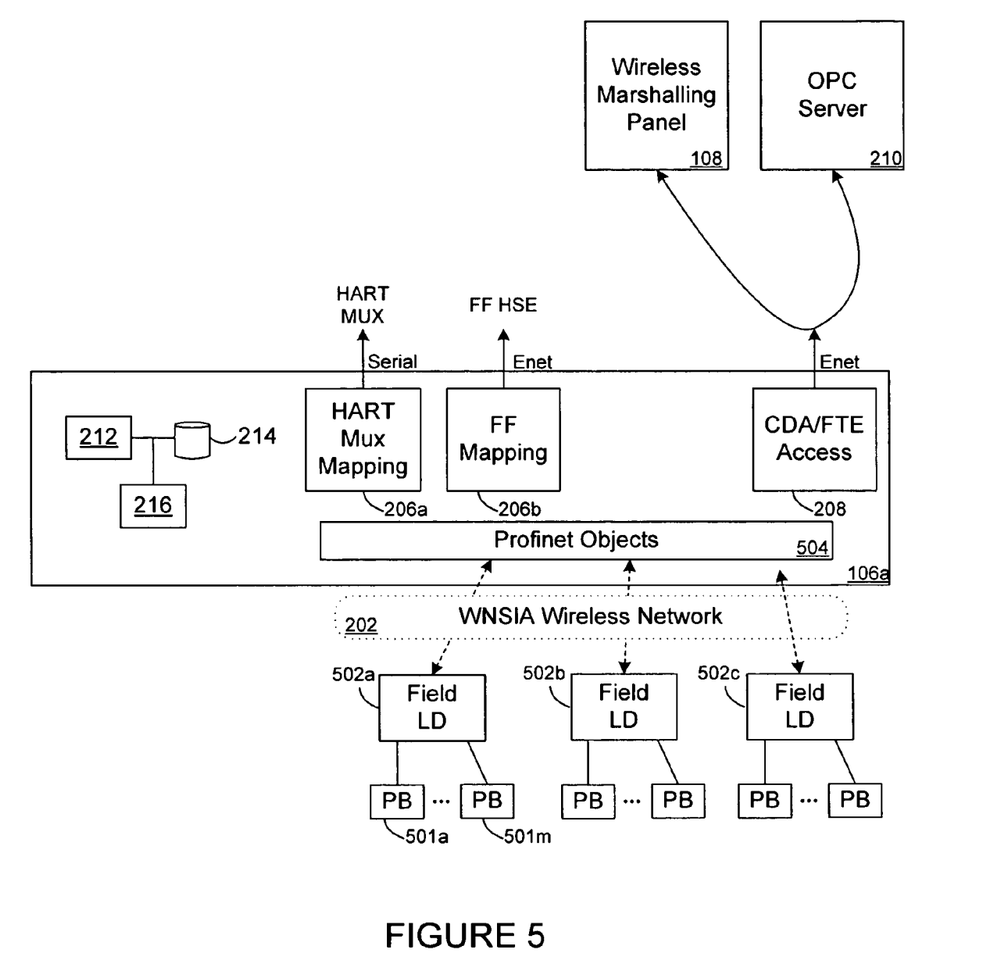

FIGS. 3 through 5 illustrate example configurations of a wireless gateway 106a in a process control system 100 according to one embodiment of this disclosure. In particular, FIGS. 3 through 5 illustrate example configurations of the wireless gateway 106a to support different field devices that use different field device protocols. The configurations shown in FIGS. 3 through 5 are for illustration only. The wireless gateway 106a could have any other or additional configuration(s) without departing from the scope of this disclosure. Also, for ease of explanation, the wireless gateway 106a is described as operating in the process control system 100 of FIG. 1. The wireless gateway 106a could be used in any other suitable system.

As shown in FIG. 3, one or more HART field devices (HD) 301a-301m are coupled to each of multiple HART field multiplexers 302a-302c. Also, the wireless gateway 106a includes HART objects 304, which define an application model supporting the HART protocol. Further, the wireless gateway 106a may convert between the HART protocol and other protocols using the FF and Profinet mappings 206b-206c. In addition, the wireless gateway 106a may use the CDA/FTE access module 208 to provide access to the OPC server 210.

In this example, the wireless gateway 106a and the field multiplexers 302a-302c function as a distributed HART multiplexer. The gateway 106a functions as the main multiplexer, and the field multiplexers 302a-302c function as sub-multiplexers to the gateway 106a. The wireless network 202 connects the distributed components of the HART multiplexer and passes the HART protocol.

In this configuration, the FF mapping 206b allows the HART field devices 301a-301m to appear as FF devices distributed under a linking device on an HSE connection. The Profinet mapping 206c allows the HART field devices 301a-301m to appear as Profibus devices distributed under a linking device on a Profinet connection. Because of this, the HART field devices 301a-301m may appear to components in the process control system 100 (such as the process controller 104, asset management tool 122, or configuration tool 124) as FF devices or Profibus devices. As a result, components in the process control system 100 could use these two protocols (in addition to the HART protocol) to communicate with, interact with, and control the HART field devices 301a-301m.

As shown in FIG. 4, one or more FF field devices 401a-401m are coupled to each of multiple FF field linking devices (LD) 402a-402c using FF H1 links. Also, the wireless gateway 106a includes FF objects 404, which define an application model supporting the FF protocol. Further, the wireless gateway 106a may convert between the FF protocol and other protocols using the HART multiplexer and Profinet mappings 206a, 206c. In addition, the wireless gateway 106a may use the CDA/FTE access module 208 to provide access to the wireless marshalling panel 108 and the OPC server 210.

In this example, the wireless gateway 106a and the FF field linking devices 402a-402c function as a network of HSE-to-H1 linking devices compliant with the FF protocol. Also, the wireless network 202 functions as an Ethernet connection between the gateway 106a and the field linking devices 402a-402c and passes the FF HSE protocol.

In this configuration, the HART multiplexer mapping 206a allows the FF field devices 401a-401m to appear as HART devices distributed under a HART hardware multiplexer. The wireless marshalling panel 108 may make primary variable data from the FF field devices 401a-401m available to conventional HART systems in 4-20 mA form. The Profinet mapping 206c allows the FF field devices 401a-401m to appear as Profibus devices distributed under a linking device on a Profinet connection. Because of this, components in the process control system 100 could use these two protocols (in addition to the FF protocol) to communicate with, interact with, and control the FF field devices 401a-401m.

As shown in FIG. 5, one or more Profibus field devices (PB) 501a-501m are coupled to each of multiple Profibus field linking devices 502a-502c. Also, the wireless gateway 106a includes Profinet objects 504, which define an application model supporting the Profibus protocol. Further, the wireless gateway 106a may convert between the Profibus protocol and other protocols using the HART multiplexer and FF mappings 206a-206b. In addition, the wireless gateway 106a may use the CDA/FTE access module 208 to provide access to the wireless marshalling panel 108 and the OPC server 210.

In this example, the wireless gateway 106a and the Profibus field linking devices 502a-502c function as a network of Profinet-to-Profibus linking devices compliant with the Profinet protocol. Also, the wireless network 202 functions as an Ethernet connection between the gateway 106a and the field linking devices 502a-502c and passes the Profinet protocol.

In this configuration, the HART multiplexer mapping 206a allows the Profibus field devices 501a-501m to appear as HART devices distributed under a HART hardware multiplexer. The wireless marshalling panel 108 may make primary variable data from the Profibus field devices 501a-501m available to conventional HART systems in 4-20 mA form. The FF mapping 206b allows the Profibus field devices 501a-501m to appear as FF devices distributed under a linking device on a FF HSE connection. As a result, components in the process control system 100 could use these two protocols (in addition to the Profibus protocol) to communicate with, interact with, and control the Profibus field devices 501a-501m.

Although FIGS. 3 through 5 illustrate examples of the configurations of a wireless gateway 106a in a process control system 100, various changes may be made to FIGS. 3 through 5. For example, the wireless gateway 106a could support any other or additional wireless protocol(s) and is not limited to just the WNSIA protocol. Also, the wireless gateway 106a could support any other or additional mapping(s), access module(s), and wired protocol(s). In addition, the wireless gateway 106a could be configured in any other or addition manner.

Figure 6:
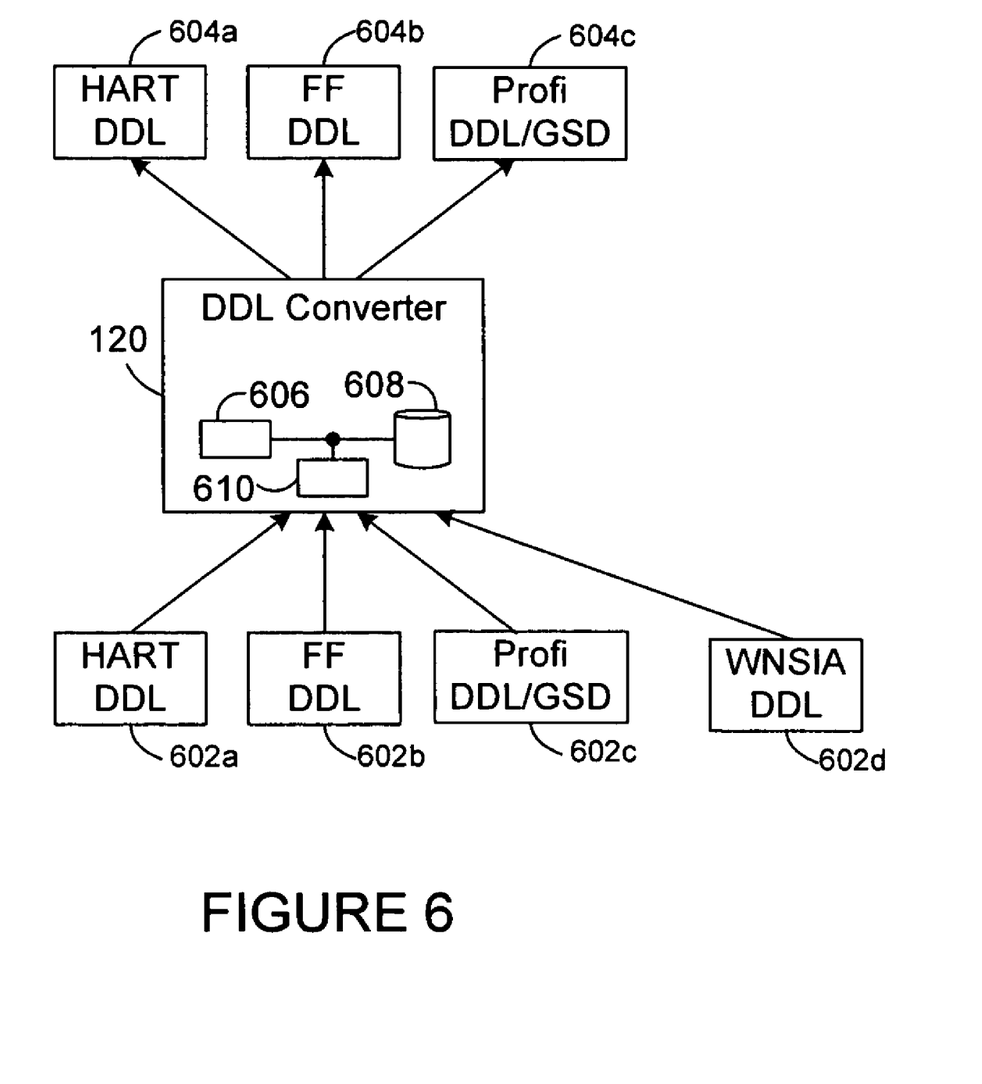
FIG. 6 illustrates an example device description language (DDL) converter in a process control system according to one embodiment of this disclosure.

FIG. 6 illustrates an example DDL converter 120 in a process control system 100 according to one embodiment of this disclosure. The DDL converter 120 shown in FIG. 6 is for illustration only. Other embodiments of the DDL converter 120 could be used without departing from the scope of this disclosure. Also, for ease of explanation, the DDL converter 120 is described as operating in the process control system 100 of FIG. 1. The DDL converter 120 could be used in any other suitable system, such as when the DDL converter 120 is used separate from the process control system 100 and the output of the DDL converter 120 is provided for use in the process control system 100.

In some embodiments, various components in the process control system 100 support different field device protocols than the field devices 101*a*-101*m*. For example, in the configuration of the wireless gateway 106*a* shown in FIG. 3, the field devices 301*a*-301*m* are HART devices, but the process controller 104, asset management tool 122, or configuration tool 124 could support only the FF protocol or the Profibus protocol. Ordinarily, the HART field devices 301*a*-301*m* would be described to other components in the process control system 100 using HART device descriptors (HART DDL files). However, the field devices 301*a*-301*m* and the other components in the system 100 may use different protocols and therefore different device description languages.

In order to facilitate communication and interaction with all of the field devices, the DDL converter 120 converts DDL files from one format or protocol to another. For example, the DDL converter 120 may convert a HART DDL file 602*a* into a FF DDL file 604*b* and/or a Profibus DDL or GSD file 604*c*. The DDL converter 120 may also convert a FF DDL file 602*b* into a HART DDL file 604*a* and/or a Profibus DDL or GSD file 604*c*. Further, the DDL converter 120 may convert a Profibus DDL or GSD file 602*c* into a HART DDL file 604*a* and/or a FF DDL file 604*b*. In addition, the DDL converter 120 may convert a WNSIA DDL file 602*d* into a HART DDL file 604*a*, a FF DDL file 604*b*, and/or a Profibus DDL or GSD file 604*c*.

In this way, a DDL file for each field device may be available to any component in the process control system 100, no matter what protocol(s) or device description language(s) those components support. Each component (such as the process controller 104, the asset management tool 122, and the configuration tool 124) can use a field device's original DDL file or a converted DDL file from the DDL converter 120 to interact with that field device.

When converting a DDL file 602*a*-602*d* from one protocol to another, the DDL converter 120 could examine the DDL file 602*a*-602*d*, break the DDL file 602*a*-602*d* down into its components, and reconstruct the components into one or more converted DDL files 604*a*-604*c*. The converted DDL files 604*a*-604*c* represent DDL files containing the logic or content of the original DDL file 602*a*-602*d* expressed in a different format or protocol.

In this embodiment, the DDL converter 120 includes one or more processors 606 and one or more memories 608 storing data and instructions used by the processor(s) 606 (such as software for converting DDL files). Also, the DDL converter 120 includes at least one interface 610, which may allow the DDL converter 120 to communicate with other components of the process control system 100. The interface 610 could represent any suitable interface, such as an Ethernet interface.

In this example, the DDL converter 120 converts HART, FF, Profibus, or WNSIA DDL files 602*a*-602*d* into one or more HART, FF, and Profibus DDL or GSD files 604*a*-604*c*. This is for illustration only. The DDL converter 120 could convert any suitable DDL file into any suitable converted DDL file or files.

The following represents specific details regarding the WNSIA DDL file 602*d* shown in FIG. 6. This represents additional details regarding one specific implementation of the system 100. Other systems could be used without departing from the scope of this disclosure. Also, modifications to the WNSIA protocol are contemplated and within the scope of this disclosure.

The WNSIA DDL is based on the FF DDL, so developers may develop WNSIA DDL files 602*d* using the FF tokenizer toolkit and the FF standard DD library toolkit from the Fieldbus Foundation. Developers may develop devices (such as the gateway 106*a*) that communicate with WNSIA devices using the FF DD services toolkit from the Fieldbus Foundation.

In particular embodiments, WNSIA DDL files 602*d* may include a subset of the DDL constructs defined in the FF DDL specification (such as Specification FF-900, which is hereby incorporated by reference). For example, the DDL constructs that may be used in WNSIA DDL files 602*d* could include the BLOCK, VARIABLE, MENU, EDIT-DISPLAY, METHOD, RELATION, UNIT, REFRESH, WRITE-AS-ONE, ITEM-ARRAY, COLLECTION, RECORD, ARRAY, RESPONSE CODE, LIKE keyword, EXPRESSION, and possibly CONDITIONAL constructs. As another example, the DDL constructs that may not be used in WNSIA DDL files 602*d* could include the PROGRAM, DOMAIN, VARIABLE LIST, OPEN/CLOSE keywords, and possibly CONDITIONAL constructs.

To facilitate the generation of WNSIA DDL files 602*d* by vendors, manufacturers, or other entities associated with field or other devices, standard wireless DD files could be made available or provided to the entities. These standard DD files could be provided for each transducer block type (such as analog input, analog output, digital input, digital output), and the standard files may be imported into WNSIA device DDL source files. The vendors, manufacturers, or other entities could add their own device-specific parameters to the standard DD files, such as by using the ADD, DELETE, and REDEFINE DDL constructs to add, delete, or modify the attributes of a block. The vendors, manufacturers, or other entities could be prevented from deleting any of the standard or required attributes of the imported standard DD files (although they could be redefined using the REDEFINE construct). The Foundation Fieldbus Specification FF-901 (which is hereby incorporated by reference) provides additional information about these constructs and their attributes.

DD developers could rely on a set of specifications, tools, and standard files to produce WNSIA DDL files 602*d*. The standard specifications may include the FF DDL source language specification, which specifies a structured text language used to define the meaning and relationships between available wireless device data. It also specifies the syntax of the language used in WNSIA DDL source files. Another standard specification is the FF DDL binary encoding specification, which specifies a standard encoding of DDL source files into a binary file format. Device specifications could also be used, where the device specifications are used to customize standard wireless DDL files and produce vendor-, manufacturer-, or other entity-specific DDL files for given device types. Once created, DDL source files may be tokenized into binary format and delivered to a host system, which uses FF DD services libraries to interpret information contained in the binary WNSIA DDL files.

Although FIG. 6 illustrates one example of a DDL converter 120 in a process control system 100, various changes may be made to FIG. 6. For example, the DDL converter 120 may be capable of converting DDL files from any other or additional format or protocol into any other or additional format or protocol. Also, the DDL converter 120 may operate using any suitable DDL files, including source or binary DDL files.

Figure 7:
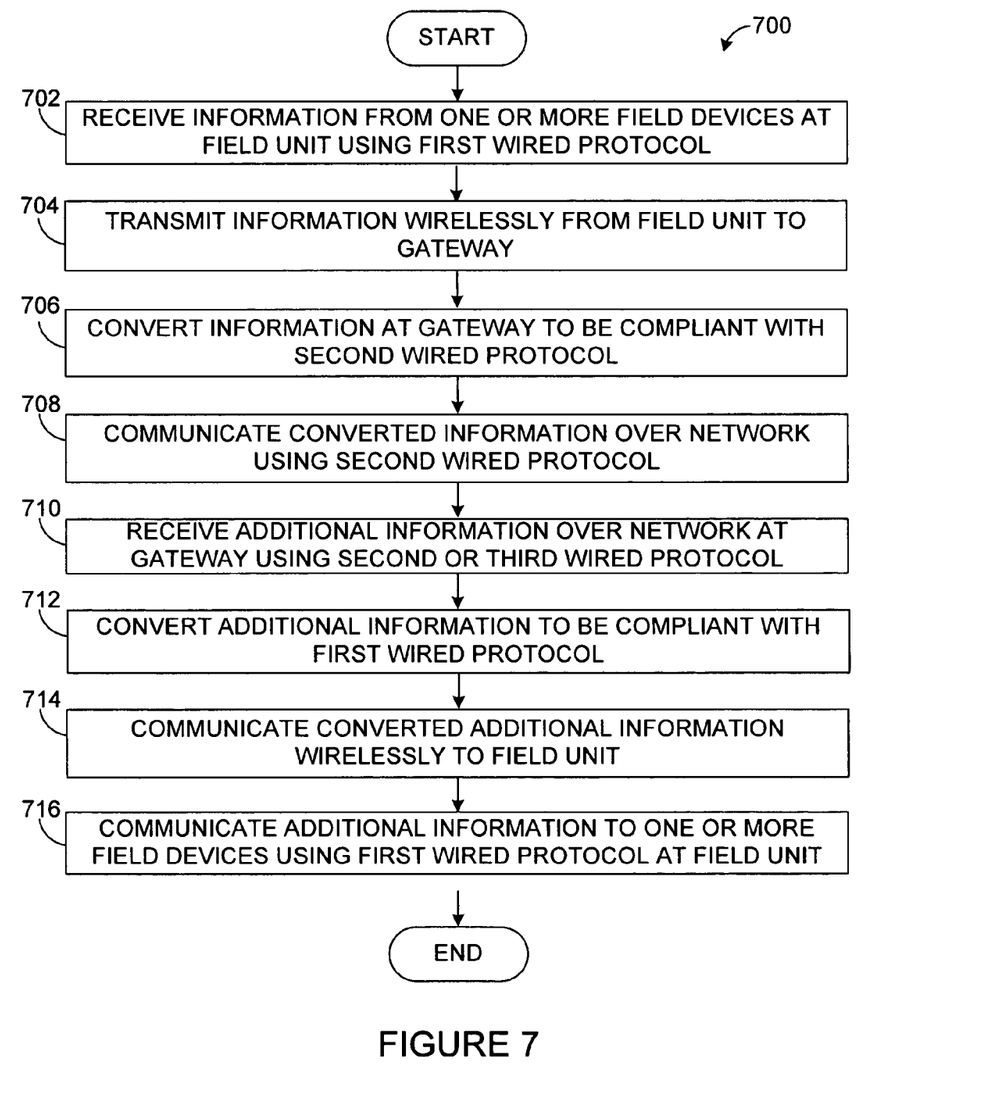
FIG. 7 illustrates an example method for integrating a wireless network with wired field devices in a process control system according to one embodiment of this disclosure.

FIG. 7 illustrates an example method 700 for integrating a wireless network with wired field devices in a process control system according to one embodiment of this disclosure. For ease of explanation, the method 700 is described with respect to the wireless gateway 106a of FIG. 2 operating in the process control system 100 of FIG. 1. The method 700 could be used by any other suitable device and in any other suitable system.

A field unit 102a receives information from one or more field devices at step 702. This may include, for example, the field unit 102a receiving information compliant with a first wired protocol from at least one of the field devices 101a-101m.

The field unit 102a transmits the received information wirelessly to a gateway at step 704. This may include, for example, the field unit 102a transmitting the information from the field device(s) 101a-101m over a WNSIA wireless network 202 to the wireless gateway 106a.

The wireless gateway 106a converts the received information into information compliant with a second wired protocol at step 706. This may include, for example, the wireless gateway 106a converting the information from HART field devices into information compliant with the FF or Profibus protocol. In particular embodiments, the wireless gateway 106a uses one or more of the mappings 206a-206c or the access module 208 to convert information from the field device(s) into messages compliant with a different wired protocol.

The wireless gateway 106a communicates the converted information over a network using the second wired protocol at step 708. This may include, for example, the wireless gateway 106a transmitting the converted information over an Ethernet network or a serial network.

The wireless gateway 106a may receive additional information over the network for the field device(s) at step 710. This may include, for example, the wireless gateway 106a receiving additional information for one or more field devices 101a-101m over a serial network or an Ethernet network. The additional information could originate from any suitable source, such as the process controller 104, the asset management tool 122, or the configuration tool 124. The additional information may be received using the second wired protocol or a different third wired protocol.

The wireless gateway 106a converts the additional information into information suitable for transmission to the field device(s) at step 712. This may include, for example, the wireless gateway 106a converting FF or Profibus information into information compliant with the HART protocol. In particular embodiments, the wireless gateway 106a uses one or more of the mappings 206a-206c or the access module 208 to convert information from the second or third wired protocol into information compliant with the first wired protocol.

The wireless gateway 106a communicates the converted additional information to the field unit at step 714. This may include, for example, the wireless gateway 106a transmitting the converted additional information to the field unit 102a wirelessly.

The field unit 102a communicates the converted additional information to one or more of the field devices at step 716. This may include, for example, the field unit 102a transmitting the converted additional information to the field device(s) 101a-101m using the first wired protocol.

In this way, the field devices and the other components in the process control system 100 are not affected by the use of a wireless network in the system 100. Moreover, the other components in the process control system 100 may communicate with the field devices, even if the field devices and the other components support different field device protocols.

Although FIG. 7 illustrates one example of a method 700 for integrating a wireless network with wired field devices in a process control system, various changes may be made to FIG. 7. For example, the field units 102a-102n and the wireless gateway 106a could use any suitable wired protocol and/or wireless protocol in the process control system 100. Also, steps 702-708 could be performed without steps 710-716, or vice versa.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system, comprising:
   a plurality of field units, each field unit operable to communicate with an associated plurality of wired field devices in a process control system using one of a plurality of first wired field device protocols;
   a gateway operable to wirelessly communicate with the field units, the gateway also operable to communicate using a plurality of second wired field device protocols, the gateway further operable to convert messages from the first wired field device protocol to at least one of the second wired field device protocols, the messages comprising information from two or more of the wired field devices and multiplexed by the field units; and a marshalling panel that is separate from the gateway, the marshalling panel operable to communicate with the gateway and with a first component of the process control system, the marshalling panel operable to convert the messages from at least one of the second wired field device protocols to a third wired field device protocol used by the first component of the process control system;

wherein:

the gateway comprises a plurality of wired protocol objects and a plurality of mappings, the wired protocol objects representing multiple first application models that define how communications occur according to the first wired field device protocols, each mapping representing a map of one of the first application models to one of a plurality of second application models associated with one of the second wired field device protocols;

the first component of the process control system is operable to provide a control signal to one or more of the wired field devices via the marshalling panel, the gateway, and the field unit; and the gateway and the field units are configured to operate as a distributed multiplexer under the first wired field device protocol, the gateway configured to further multiplex the multiplexed information from the field units.

2. The system of claim 1, wherein the gateway is further operable to permit access to the wired field devices by the first component of the process control system that views the wired field devices as a first type of field device and, at the same time, permit access to the wired field devices by a second component of the process control system that views the wired field devices as a second type of field device.

3. The system of claim 1, wherein the first component of the process control system comprises at least one of: a process controller, an asset management tool, and a configuration tool.

4. The system of claim 1, wherein:

the first wired field device protocol used by the wired field devices comprises one of: a Foundation Fieldbus protocol and a Profibus protocol;

the gateway is operable to cause the wired field devices to appear as Highway Addressable Remote Transducer (HART) field devices; and a second component of the process control system comprises a component operable to use a HART protocol to communicate with the gateway.

5. The system of claim 4, wherein at least one of the mappings maps data from the wired field devices into a serial or Ethernet HART-compliant data stream such that the gateway appears as a HART multiplexer to the second component of the process control system and the field unit appears as a HART sub-multiplexer to the second component of the process control system.

6. The system of claim 1, wherein:

the first wired field device protocol used by the wired field devices comprises a Highway Addressable Remote Transducer (HART) protocol;

the gateway is operable to cause the wired field devices to appear as one of: Foundation Fieldbus field devices and Profibus field devices; and a second component of the process control system comprises a component operable to use one of: a Foundation Fieldbus protocol and a Profibus protocol to communicate with the gateway.

7. An apparatus, comprising:

at least one memory operable to store:

a plurality of wired protocol objects representing multiple first application models that define how communications occur according to a plurality of first wired field device protocols; and mapping information defining a plurality of mappings, wherein each mapping maps one of the first application models associated with one of the first wired field device protocols to one of a plurality of second application models associated with one of a plurality of second wired field device protocols; and at least one processor operable to:

receive first information transmitted wirelessly from each of a plurality of field units, each field unit operable to communicate with an associated plurality of wired field devices in a process control system using one of the first wired field device protocols, wherein the first information comprises information from two or more of the wired field devices and multiplexed by the field units, the information from the two or more wired field devices comprising scan information received in response to scans of the field devices by the field units;

convert the first information into second information associated with at least one of the second wired field device protocols using at least some of the mapping information; and communicate the second information using at least one of the second wired field device protocols to a marshalling panel for delivery to a first component of the process control system, the marshalling panel separate from the apparatus and operable to convert the second information associated with the at least one second wired field device protocol into third information associated with a third wired field device protocol used by the first component of the process control system;

wherein the gateway and the field units are configured to operate as a distributed multiplexer under the first wired field device protocol, the gateway configured to further multiplex the multiplexed information from the field units.

8. The apparatus of claim 7, wherein the at least one processor is further operable to:

receive third information associated with at least one of the second wired field device protocols;

convert the third information associated with at least one of the second wired field device protocols into fourth information associated with at least one of the first wired field device protocols using at least some of the mapping information; and initiate wireless communication of the fourth information to at least one of the field units for delivery to one or more of the wired field devices.

9. The apparatus of claim 7, further comprising at least one interface operable to communicate over a network, the at least one interface comprising at least one of: an Ethernet interface and a serial interface.

10. The apparatus of claim 7, wherein the at least one processor is operable to permit access to the wired field devices by the first component of the process control system that views the wired field devices as a first type of field device and, at the same time, permit access to the wired field devices by a second component of the process control system that views the wired field devices as a second type of field device.

11. The apparatus of claim 10, wherein the first wired field device protocol used by each plurality of wired field devices, the second wired field device protocol used by the first component of the process control system, and the second wired field device protocol used by the second component of the process control system are different from one another.

12. The apparatus of claim 10, wherein:
the first and second components comprise at least one of: a process controller, an asset management tool, and a configuration tool; and
the wired field devices comprise at least one of: one or more sensors and one or more actuators.

13. The apparatus of claim 7, wherein:
the first wired field device protocol used by each plurality of wired field devices comprises one of: a Foundation Fieldbus protocol and a Profibus protocol;
the apparatus is operable to cause the wired field devices to appear as Highway Addressable Remote Transducer (HART) field devices; and
a second component of the process control system comprises a component operable to use a HART protocol to communicate with the apparatus.

14. The apparatus of claim 7, wherein:
the first wired field device protocol used by each plurality of wired field devices comprises a Highway Addressable Remote Transducer (HART) protocol;
the apparatus is operable to cause the wired field devices to appear as one of: Foundation Fieldbus field devices and Profibus field devices; and
a second component of the process control system comprises a component operable to use one of: a Foundation Fieldbus protocol and a Profibus protocol to communicate with the apparatus.

15. A method, comprising:
storing a plurality of wired protocol objects in a gateway, the wired protocol objects representing multiple first application models that define how communications occur according to a plurality of first wired field device protocols;
storing a plurality of mappings in the gateway, wherein each mapping maps one of the first application models associated with one of the first wired field device protocols to one of a plurality of second application models associated with one of a plurality of second wired field device protocols;
wirelessly receiving first information from each of a plurality of field units at the gateway, each field unit communicating with an associated plurality of wired field devices in a process control system using at least one of the first wired field device protocols, the first information comprising information from two or more of the wired field devices and multiplexed by the field units;
converting in the gateway the first information into second information associated with at least one of the second wired field device protocols using at least one of the mappings; and
communicating the second information from the gateway using the at least one of the second wired field device protocols to a marshalling panel for delivery to a first component of the process control system, the marshalling panel separate from the gateway and converting the second information associated with the at least one second wired field device protocol into third information associated with a third wired field device protocol used by the first component of the process control system;
wherein the gateway and the field units are configured to operate as a distributed multiplexer under the first wired field device protocol, the gateway configured to further multiplex the multiplexed information from the field units.

16. The method of claim 15, wherein the plurality of first wired field device protocols and the plurality of second wired field device protocols have at least one common wired field device protocol.

17. The method of claim 15, wherein the first component comprises a process controller.

18. The method of claim 15, further comprising:
causing the wired field devices to appear as if the wired field devices are coupled to the distributed multiplexer and to a linking device at the same time.

19. The method of claim 15, wherein:
the first wired field device protocol used by each plurality of wired field devices comprises one of: a Foundation Fieldbus protocol and a Profibus protocol;
the method further comprises causing the wired field devices to appear as Highway Addressable Remote Transducer (HART) field devices; and
a second component of the process control system comprises a component operable to use a HART protocol to communicate with the wired field devices.

20. The method of claim 15, wherein:
the first wired field device protocol used by each plurality of wired field devices comprises a Highway Addressable Remote Transducer (HART) protocol;
the method further comprises causing the wired field devices to appear as one of: Foundation Fieldbus field devices and Profibus field devices; and
a second component of the process control system comprises a component operable to use one of: a Foundation Fieldbus protocol and a Profibus protocol to communicate with the wired field devices.

21. A tangible computer readable storage medium embodying a computer program, the computer program comprising computer readable program code for:
storing a plurality of wired protocol objects representing multiple first application models that define how communications occur according to a plurality of first wired field device protocols;
storing a plurality of mappings, wherein each mapping maps one of the first application models associated with one of the first wired field device protocols to one of a plurality of second application models associated with one of a plurality of second wired field device protocols;
receiving first information transmitted wirelessly from each of a plurality of field units to a gateway, each field unit configured to communicate with an associated plurality of wired field devices using one of the first wired field device protocols, the first information comprising information from two or more of the wired field devices and multiplexed by the field units;
converting the first information into second information associated with at least one of the second wired field device protocols using at least one of the mappings;
initiating communication of the second information using at least one of the second wired field device protocols to a marshalling panel for delivery to a first component of the process control system, the marshalling panel separate from the gateway and operable to convert the second information associated with the at least one second wired field device protocol into third information associated with a third wired field device protocol used by the first component of the process control system; and causing the gateway to operate as a distributed multiplexer along with the plurality of field units under the first wired field device protocol and to further multiplex the multiplexed information from the field units.

22. The computer readable storage medium of claim 21, further comprising computer readable program code for:

receiving third information using at least one of the second wired field device protocols;

converting the third information into fourth information associated with at least one of the first wired field device protocols; and initiating wireless transmission of the fourth information to at least one of the field units for delivery to one or more of the wired field devices using at least one of the first wired field device protocols.

23. The computer readable storage medium of claim 21, wherein:

the first wired field device protocol used by each plurality of wired field devices comprises one of: a Foundation Fieldbus protocol and a Profibus protocol;

the computer program when executed causes the wired field devices to appear as Highway Addressable Remote Transducer (HART) field devices; and a second component of the process control system comprises a component operable to use a HART protocol to communicate with the gateway.

24. The computer readable storage medium of claim 21, wherein:

the first wired field device protocol used by each plurality of wired field devices comprises a Highway Addressable Remote Transducer (HART) protocol;

the computer program when executed causes the wired field devices to appear as one of: Foundation Fieldbus field devices and Profibus field devices; and a second component of the process control system comprises a component operable to use one of: a Foundation Fieldbus protocol and a Profibus protocol to communicate with the gateway.

* * * * *